United States Patent
Radunovic et al.

(10) Patent No.: US 8,045,463 B2
(45) Date of Patent: Oct. 25, 2011

(54) PATH ESTIMATION IN A WIRELESS MESH NETWORK

(75) Inventors: Bozidar Radunovic, Cambridge (GB); Christos Gkantsidis, Cambridge (GB); Dinan Gunawardena, Cambridge (GB); Peter B. Key, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 158 days.

(21) Appl. No.: 12/182,493

(22) Filed: Jul. 30, 2008

(65) Prior Publication Data
US 2010/0027424 A1  Feb. 4, 2010

(51) Int. Cl.
*H04J 3/14* (2006.01)
(52) U.S. Cl. ......................... 370/231; 370/238
(58) Field of Classification Search .................. 370/217, 370/231, 232, 235, 237, 238, 255, 338, 395.4
See application file for complete search history.

(56) References Cited

U.S. PATENT DOCUMENTS

| | | | |
|---|---|---|---|
| 5,802,056 A | 9/1998 | Ferguson et al. | |
| 6,563,833 B1 | 5/2003 | Wool et al. | |
| 7,512,106 B2 * | 3/2009 | Van Tran et al. | 370/338 |
| 2002/0150098 A1 | 10/2002 | Sharony | |
| 2003/0152083 A1 * | 8/2003 | Nagata et al. | 370/395.4 |
| 2003/0212821 A1 | 11/2003 | Gillies et al. | |
| 2005/0007949 A1 * | 1/2005 | Okura | 370/217 |
| 2005/0071504 A1 * | 3/2005 | Handlogten et al. | 709/239 |
| 2005/0220054 A1 | 10/2005 | Meier et al. | |
| 2005/0220097 A1 * | 10/2005 | Swami et al. | 370/389 |
| 2006/0280131 A1 | 12/2006 | Rahman et al. | |
| 2007/0079008 A1 | 4/2007 | Leibovich et al. | |
| 2007/0286097 A1 * | 12/2007 | Davies | 370/255 |
| 2007/0286108 A1 | 12/2007 | Meier et al. | |
| 2008/0279101 A1 * | 11/2008 | Wu et al. | 370/235 |
| 2010/0246497 A1 * | 9/2010 | Kim et al. | 370/328 |

OTHER PUBLICATIONS

Boyd, et al., "Convex Optimization", Cambridge University Press, Ch. 5.5.3, 2004, pp. 243-246.
Caesar, et al., "Virtual Ring Routing: Network Routing Inspired by DHTs", ACM SIGCOMM 2006 (1595933085/06/0009), 2006, pp. 351-362.
Chen, et al., "Cross-layer Congestion Control, Routing and Scheduling Design in Ad Hoc Wireless Networks", IEEE INFOCOM, 2006, pp. 1-13.
Eryilmaz, et al., "Joint Congestion Control, Routing and MAC for Stability and Fairness in Wireless Networks", IEEE Journal on Selected Areas in Communications, vol. 24, No. 8, 2006, pp. 1514-1524.
Georgiadis, et al., "Resource Allocation and Cross-Layer Control in Wireless Networks", Foundations and Trends in Networking, vol. 1, No. 1, 2006, pp. 1-144.
Lin, et al., "Joint Rate Control and Scheduling in Multihop Wireless Networks", IEEE CDC, vol. 2, 2004, pp. 1484-1489.

(Continued)

*Primary Examiner* — Seema S. Rao
*Assistant Examiner* — Leon Andrews
(74) *Attorney, Agent, or Firm* — Lee & Hayes, PLLC

(57) ABSTRACT

In example methods and algorithms, a node in a wireless mesh network calculates an estimated cost for a packet flow through the node. The estimation may be based on the back-log at the node and the cost of downstream neighbor nodes for the flow. Further, selection of a downstream flow and a downstream neighbor node may be based on the estimation. A packet re-ordering algorithm is also described which intercepts packets received at a node and delays delivery of the packet to the IP layer if an earlier packet in the sequence of packets has not been received.

20 Claims, 9 Drawing Sheets

OTHER PUBLICATIONS

Neely, et al., "Fairness and Optimal Stochastic Control for Heterogeneous Networks", IEEE INFOCOM, 2005, pp. 1723-1734.

Radunovic, et al., "Multipath Code Casting for Wireless Mesh Networks", retrieved on May 13, 2008 at <<http://saloot.googlepages.com/MultipathCodeCastingforWirelessMeshN.pdf>>, ACM CoNEXT conference, Article 10, 2007, pp. 1-17.

Srikant, "The Mathematics of Internet Congestion Control", Birkhauser Series: Systems and Control: Foundations and Applications, ch. 4.2.1, 2004, pp. 58-60.

Tang, et al., "Reliable On-Demand Multicast Routing with Congestion Control in Wireless Ad Hoc Networks", retrieved on May 13, 2008 at <<http://www.ee.ucla.edu/~simonhan/cs218/papers/spie01-ktang_BMW_ODMRP.pdf>>, Society of Photo-Optical Instrumentation Engineers, 1988, pp. 1-12.

Tassiulas, et al., "Stability Properties of Constrained Queueing Systems and Scheduling Policies for Maximum Throughput in Multihop Radio Networks", IEEE Transactions on Automatic Control (0018-9286/92), vol. 37, No. 12, 1992, pp. 1936-1948.

Xie, et al., "AMRoute: Ad Hoc Multicast Routing Protocol", retrieved on May 13, 2008 at <<http://www.eecs.umich.edu/~mingyan/pub/amroute-monet.pdf>>, Kluwer Academic Publishers: Mobile Networks and Applications, vol. 7, No. 6, 2002, pp. 429-439.

Ye, et al., "Effects of Multipath Routing on TCP Performance in Ad Hoc Networks", IEEE GLOBECOM, vol. 6, 2004, pp. 4125-4131.

Yuan, et al., "A Cross-Layer Optimization Framework for Multihop Multicast in Wireless Mesh Networks", retrieved on May 13, 2008 at <<http://www.eecg.toronto.edu/~bli/papers/netcoding-mesh.pdf>>, IEEE Journal on Selected Areas in Communications, Special Issue on Multihop Wireless Mesh Networks (WICON), 2005, pp. 1-11.

* cited by examiner

US 8,045,463 B2

PATH ESTIMATION IN A WIRELESS MESH NETWORK

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

In a wireless mesh network, traffic may be routed by a number of different routes between a source node and a destination node. This means that if a particular link between two nodes in the network is congested or has low performance, the traffic can be routed via an alternative route. This results in a wireless mesh network being both flexible and resilient. It is, however, difficult to achieve high performance in a wireless mesh network because of the variability in performance of any particular link (e.g. due to interference or changes in environment) and the difficulties in scheduling and routing packets. The problems are increased where packets are routed via one or more intermediate nodes (multi-hop routing).

Many existing methods for multi-hop routing rely upon back-pressure in the network to enable routing decisions. For example, routing decisions may be made based on the relative sizes of queues at a node and at the node's neighbor nodes. Such a method, however, results in large numbers of data packets being stored in the network as queues build up ahead of any congested link. These large queues result in delays and packet loss. Additionally, if there are not enough packets available such methods can be highly inefficient.

The embodiments described below are not limited to implementations which solve any or all of the disadvantages of known multi-hop transmission schemes.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and algorithms for path estimation in a wireless mesh network are described. In an embodiment, each node calculates its cost for a packet flow based on the back-log at the node and the cost of downstream neighbor nodes for the flow. The cost is communicated to the upstream neighbor nodes for the flow. When a node has an opportunity to transmit a packet, a flow is selected by the node based on the back-log at the node and the costs received from each of the downstream neighbor nodes. These costs are then also used to select a downstream neighbor node is selected based on the costs received from each of the downstream neighbor nodes. A packet re-ordering algorithm is also described which intercepts packets received at a node and delays delivery of the packet to the IP layer if an earlier packet in the sequence of packets has not been received.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, there are a number of routing algorithms which have been proposed for multi-hop routing in wireless mesh networks which are based on back-pressure scheduling. Such methods give priority to links and paths that have higher back-pressure, where back-pressure is defined as the differential back-log (or queue size) at consecutive nodes. The algorithms are, however, theoretical and extremely difficult to implement because of their complexity (back-pressure scheduling is NP hard) and because of the excessive queuing that is required in the network. Additionally, any implementation requires very large signaling overhead and new MAC protocols. Further problems arise when using multiple routes for transmission of data streams because higher level protocols (such as TCP) are not designed to accommodate multipath transmission.

Figure 1:
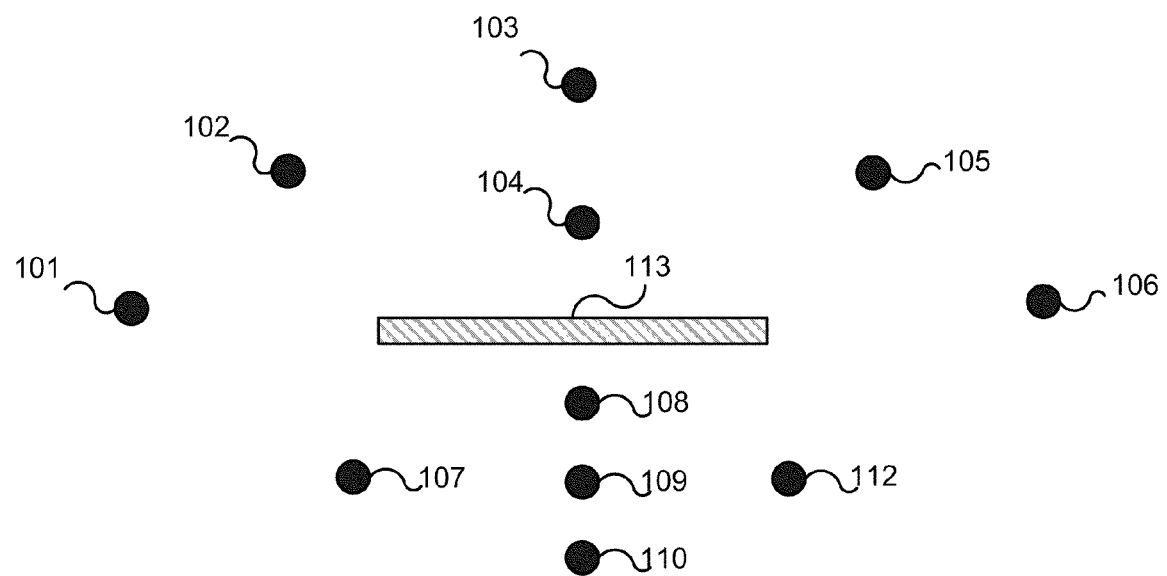
FIG. 1 is a schematic diagram of a wireless mesh network.

FIG. 1 is a schematic diagram of a wireless mesh network. The network comprises a number of nodes 101-112. In an example, a flow f goes between a source node 101 and a destination node 106. There are many different paths by which flow f may travel from the source node 101 to the destination node 106. A particular node i has a set of upstream neighbors $U_f(i)$ and a set of downstream neighbors $D_f(i)$ for flow f. These sets of upstream and downstream neighbors may be defined using a routing protocol. In the example shown in FIG. 1, node 102 has one upstream neighbor (node 101) and two downstream neighbors (nodes 103 and 104), whilst node 107 has one upstream neighbor (node 101) and three downstream neighbors (nodes 108-110). A feature 113, such as a wall, in the example wireless mesh network prevents communication between node 102 and nodes 108-110 and between node 107 and nodes 103-104. There may be additional flows within the wireless mesh network, for example a flow g from node 106 (the source of flow g) to node 107 (the destination of flow g). Each node along a path between the source and destination of flow g has a set of upstream neighbors and a set of downstream neighbors for flow g. For example, node 112 has one upstream neighbor (node 106) and three downstream neighbors (nodes 108-109). It will be appreciated that a particular node will have different sets of upstream and downstream neighbors for different flows (although in some cases these sets for different flows may partially or fully intersect dependent on the nature of the different flows).

Figure 2:
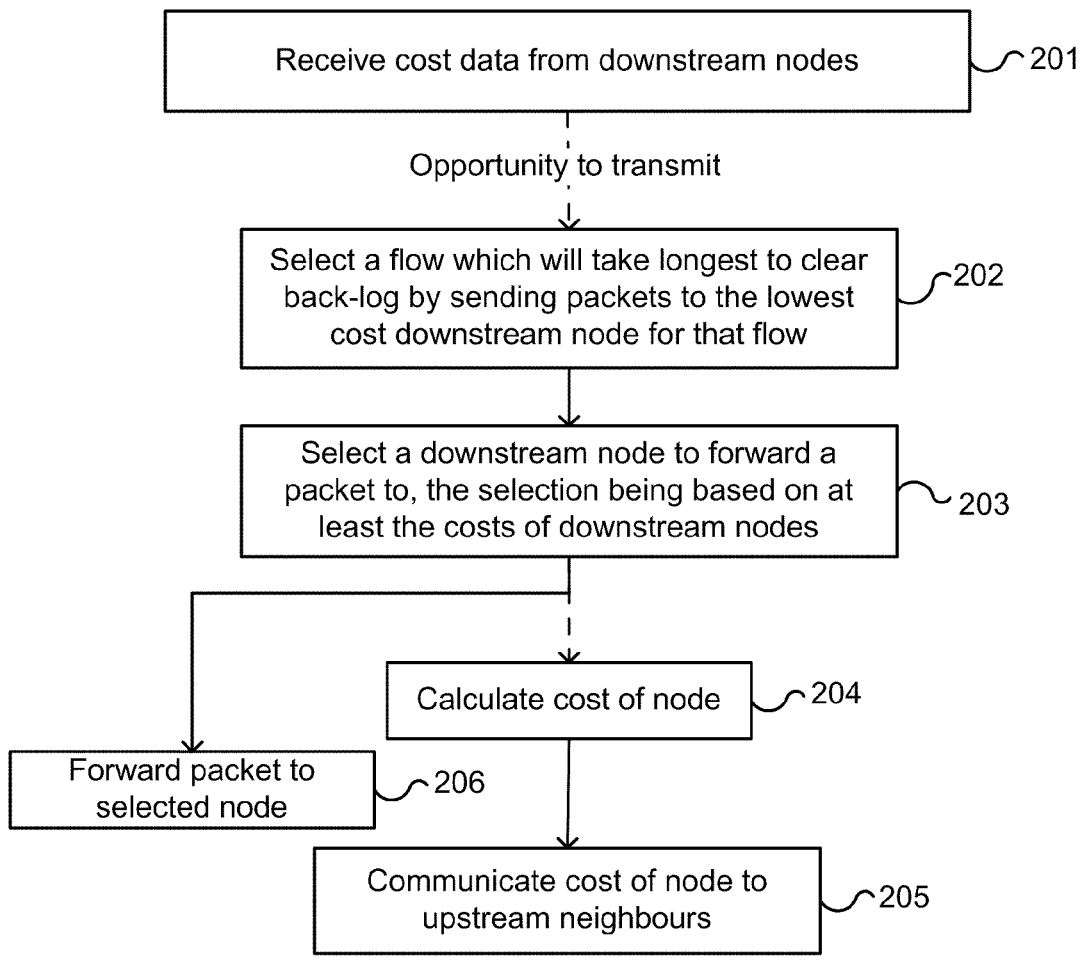
FIG. 2 is a flow diagram of an example method of path estimation.

FIG. 2 is a flow diagram of an example method of path estimation which may be used in a wireless mesh network. This method is independent of the routing protocol used to enable the sets of upstream and downstream neighbor nodes to be determined. A node receives cost data from each of its downstream neighbor node for each flow (block 201). When a node is given an opportunity to transmit (e.g. when the MAC layer has acquired the medium access and any other criteria are satisfied, e.g. as in equation (19) described below), the node selects a flow to transmit a packet from (block 202). The flow is selected from all the flows that pass through the node and is selected based on which flow will take the longest time to clear its queue of packets at that node. Having selected a flow, a node is selected to transmit a packet to (block 203). The node is selected from the set of downstream neighbors of the node for the particular selected flow and is selected at least on the basis of the costs of the downstream neighbor nodes (as received in block 201). Other factors may also be considered, e.g. queue size and/or transmission rate. The selection algorithms (used in blocks 202 and 203) and the node costs are described in detail below. Having selected a flow (in block 202) and a destination node (in block 203), a packet may be forwarded to the selected destination node (block 206).

In order for a node to be able to make the selection of a downstream neighbor node to transmit a packet to (in block 203), the node must have information on the costs of each of its downstream neighbor nodes (as received in block 201). Each node therefore periodically calculates its own cost (block 204) and communicates this cost to its upstream neighbors (block 204). The cost of a node is computed on a per flow basis, i.e. a node which is in the path for two flows will compute two node costs, one for each flow, and will communicate the computed node cost to the set of upstream neighbors for the relevant flow. The communication of the node costs (in block 205) may be done by including cost values in the header of a packet (as described in more detail below), by explicitly signaling these values, by including the value in an existing signaling packet (e.g. a 802.11 signaling packet such as an RTS, CTS or ACK), through a separate communication channel (e.g. on another frequency) or using another technique.

The cost of a node i, $C_i^f$ is the estimated minimum cost of any path for flow f from node i to the destination of flow f and this may be computed using the following algorithm:

$$j(g) = \underset{j \in D_g(i)}{\mathrm{argmin}} \left( \frac{P_i^g}{R_{ij}} + C_j^g \right) \quad (1)$$

$$S_i = \max_{g \in F} \frac{P_i^g}{R_{ij(g)}} \quad (2)$$

-continued $$C_i^g = S_i + C_{j(g)}^g \quad (3)$$

where: j(g) is the lowest cost neighbor of node i for a flow g
$P_i^g$ is the number of packets of flow g queued at node i
$R_{ij}$ is the transmission rate from node i to node j
$C_j^g$ is the cost of neighbor node j for flow g (as communicated to node i by node j and as received in block 201)
$D_g(i)$ is the set of downstream nodes of node i for flow g (e.g. as determined using a routing protocol)
F is the set of flows in the network The value $S_i$ (as computed using equation (2)) may be considered to be a cost penalty for the node i and corresponds to the maximum time, for any of the flows, needed to transmit all of the packets queued for a flow (at node i) to the best available neighbor for that flow. The cost $C_i^f$ of a node i for a particular flow f therefore includes both the effect of all of the flows at node i (through term $S_i$) and the effect of nodes and links which are further downstream (for the particular flow) than the neighbor node (through the flow of costs back through the network), whilst only requiring information to be communicated between neighbor nodes. The algorithm can therefore be implemented in a distributed system.

Whenever a node i gets an opportunity to transmit a packet, it first selects a flow f* to transmit a packet from (in block 202) and this flow f* may be selected using:

$$f^* = \underset{g \in F, P_i^g > 0}{\mathrm{argmax}} \frac{P_i^g}{R_{ij(g)}} \quad (4)$$

This selects a flow where there are packets queued at node i ($P_i^g > 0$) and where the queue is the one which will take the longest time to clear by transmitting packets (at rate $R_{ij(g)}$ to the lowest cost neighbor node for that flow (j(g)). The lowest cost neighbor node for flow g, j(g), may be calculated using equation (1), which minimizes the cost of the next hop $C_j^g$ plus the time to send all queued packets $P_i^g$ to it.

Having selected a flow f* (in block 202), the node selects a downstream node j* for that flow to which it will transmit a packet (in block 203) and this node j* may be selected using:

$$j^* = j(f^*) \quad (5)$$

where j(f*) is calculated using equation (1) given above and is dependent upon both the time it will take to clear the queued packets for the flow at node i by sending them to node $$j\left(\frac{P_i^{f^*}}{R_{ij}}\right)$$

and the downstream costs of neighbor nodes ($C_j^{f^*}$).

The methods and equations above provide a lightweight path estimator and a packet-forwarding heuristic, whilst maintaining global optimality properties. The methods are compatible with 802.11 and provide a practical system which can be implemented.

Figure 3:
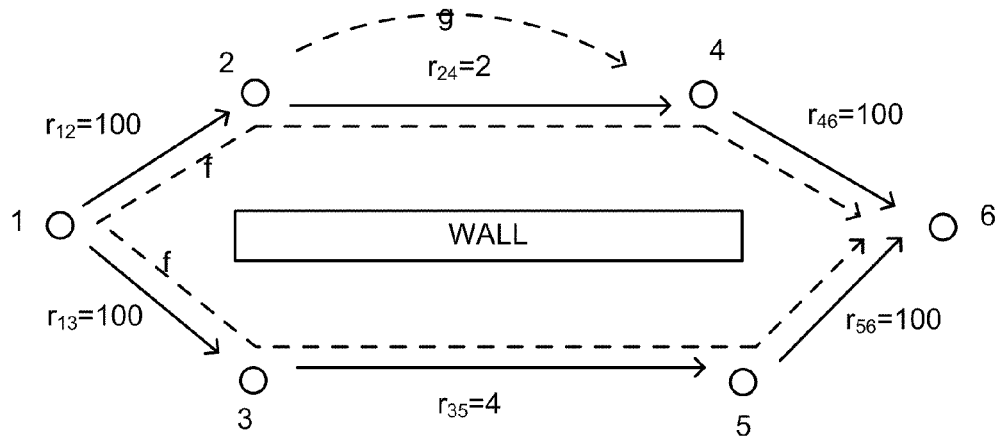
FIG. 3 is a schematic diagram of another wireless mesh network.

An example of this method in operation can be described with reference to FIG. 3. FIG. 3 shows a network with 6 nodes and may first be considered for a single flow, flow f, which goes between nodes 1 and 6. There are two links which are bottlenecks: the link between node 2 and node 4 (the link has a rate of $r_{24}=2$) and the link between node 3 and node 5 ($r_{35}=4$). All the other links are significantly faster ($r_{12}=r_{13}=r_{46}=r_{56}=100$). If $y_f$ is the rate of fresh packets injected at the source node of flow f (i.e. at node 1) and $U_f(y_f)$ is a convex function of the flow's rate that defines the flow's utility, where $U_f(y_f)$ is given by:

$$U_f(y_f) = -K/y_f$$

where K=144, it can be shown that the optimal rate of injection of fresh packets, $y_f^* = 6 (y_f^* = r_{24} + r_{34}$, see the Appendix for the mathematical reasoning). This leads to average costs of:

$$C_1^f = C_2^f = C_3^f = 4$$

$$C_4^f = C_5^f = 0$$

And queue sizes of:

$$P_1^f = P_4^f = P_5^f = 0$$

$$P_2^f = P_3^f = 4$$

This leads to 8 packets being queued in the network and compares to a back-pressure approach which would result in 12 packets queued in the network (4 nodes queued at each of nodes 1, 2 and 3 because packets accumulate before each bottleneck).

In the back-pressure approach, packets are queued in each link before a bottleneck (e.g. at nodes 1, 2 and 3) and as a result the number of queued packets increases with network size. However, using the method described above, the number of queued packets is independent of the network size because packets are only queued at the bottleneck links (e.g. at nodes 2 and 3).

In a second example, the network shown in FIG. 3 may have two flows: flow f (as described above) and flow g between nodes 2 and 4. In this example, the average optimal rate allocations can be calculated to be:

$$y_f^* = 4$$

$$y_g^* = 2$$

And the average costs and queue sizes given by:

$$C_1^f = C_3^f = 9$$

$$C_4^f = C_5^f = 0$$

$$C_2^f = C_2^g = 36$$

$$P_3^f = 9$$

$$P_2^g = 36$$

$$P_1^f = P_2^f = P_4^f = P_5^f = 0$$

This results in a total of 45 packets being queued in the network compared to 63 in a back-pressure approach.

In the back-pressure approach packets are queued on every path as without the queue, the network does not know that there is a problem with a particular link. However, in the method described above (and as shown in the second example above), it is not necessary to queue packets on a path that is not used (e.g. packets from flow f do not need to be queued at node 2). Although a small number of packets are required in the network to be able to estimate path qualities, once cost information for a node is available, it is not necessary to send a packet over a link to further estimate the performance of the link. This means that the method described above does not grow queue sizes as a function of the number of paths.

Whilst equations (1)-(5) above provide an example of the algorithms which may be used to calculate costs of a node (e.g. in block 204), to select a flow (e.g. in block 202) and to select a downstream neighbor node to transmit a packet to (e.g. in block 203), other equations may alternatively be used. These other equations may for example be variations of those shown above.

In a first example variation, the transmission rate $R_{ij}$ may be omitted from the equations (e.g. because the rate is considered to be the same between any pair of nodes, $R_{ij}=R_{ik}$), to give:

$$j(g) = \underset{j \in D_g(i)}{\operatorname{argmin}}(P_i^g + C_j^g) \qquad (6)$$

$$S_i = \max_{g \in F} P_i^g \qquad (7)$$

$$C_i^g = S_i + C_{j(g)}^g \qquad (3)$$

$$f^* = \underset{g \in F, P_i^g > 0}{\operatorname{argmax}} P_i^g \qquad (8)$$

$$j^* = j(f^*) \qquad (5)$$

In a second example variation, equation (3) may not be additive but may comprise a different function of both the value $S_i$ (the cost penalty of a node) and the cost $C_{j(f)}^f$ of the lowest cost neighbor for a particular flow. In another variation, additional parameters may be included within the cost function (e.g. within equation (3)), such as a factor which takes into consideration local knowledge available at the node.

In a further variation, the queue size $P_i^g$ may be replaced by an alternative parameter which provides an indication of the congestion of a node, for example, the number of flows at a node or a relative weight of a node which may be dependent upon the queue size and/or number of flows at a node. Similarly, the rate $R_{ij}$ may be replaced by an alternative parameter, such as any metric from the link layer. Examples of other parameters which may be used include latency, an expected number of transmission attempts per packet (ETX), the expected transmission time (ETT, which is the average time needed to transmit a packet, including all unsuccessful attempts), a difference in rates, CPU load etc. The queue size $P_i^g$ may in some examples be used for MAC scheduling priorities. In a yet further variation, aspects of any of the variations and the original algorithms described above may be combined in any manner.

When using the algorithms described above, the queue size $P_i^f$ may be measured directly or may be computed (as described in more detail below). The transmission rate $R_{ij}$ may be the physical rate over the link from node i to node j. The physical rate may, for example, be determined by querying a routing layer (e.g. the VRR (Virtual Ring Routing) layer). Alternatively, the transmission rate may be an estimated rate based on the physical rate (i.e. the current (instantaneous) rate that will be used to transmit the next packet) and the estimated average amount of time spent transmitting, e.g.

$$R_{ij} = (\text{physical rate})/(ETX)$$

or $$R_{ij} = 1/ETT$$

This provides a rate which is an estimate of the actual rate which is used over the link. Other functions of any combination of the physical rate, ETT and ETX may alternatively be used.

The node costs, $C_i^f$ as calculated above may, in addition (or instead) be used to signal congestion in a network. TCP needs to react when a network is congested and decrease the window size in order to prevent congestion collapse and enforce fairness. This is achieved in TCP by reacting to packet loss, such that each packet loss is treated as a congestion loss and the congestion window is halved. Faster flows see more congestion losses and therefore this technique provides a certain form of fairness guarantee. However, in a wireless mesh network which uses multipath routing, consecutive packets may travel over different paths, arrive out of order and incur arbitrary delays.

Figure 4:
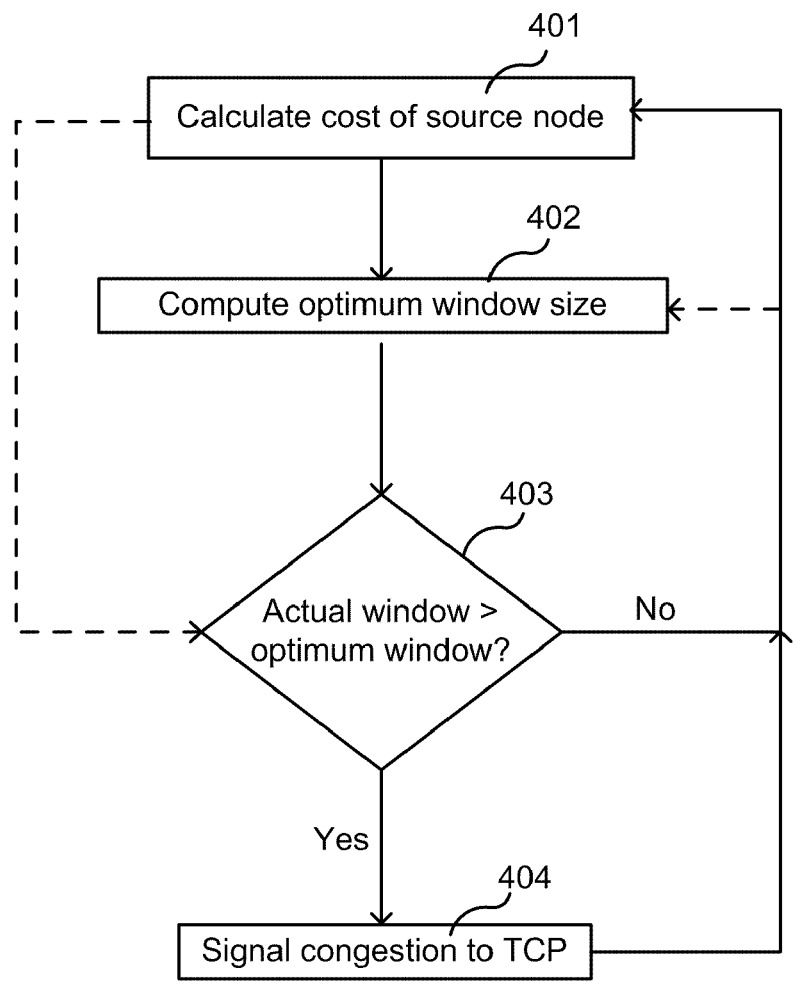
FIG. 4 shows a flow diagram of an example method of congestion control.

FIG. 4 shows a flow diagram of an example method of congestion control which may be used in a wireless mesh network. As described above, congestion may be communicated between nodes in a network in the form of node costs ($C_i^f$). The cost of a source node of a flow is calculated (block 401) and this may be performed as described above (e.g. in block 204, using equation (3)). An optimum window size is then computed based on this source node cost (block 402), and this computation is described in more detail below. If the actual window size exceeds the optimum window size ('Yes' in block 403), congestion is signaled to TCP (block 404) and examples of ways that this congestion may be signaled are described below. The method may be repeated periodically, e.g. every time the cost of the source node is computed, every time the cost of the source node changes, every time the window size changes (or increases), every time there is a change in node cost ($C_i^f$) or window size estimate, on every packet transmission/reception, when the actual window size exceeds the last calculated optimum window size by a defined amount etc. In some examples, the cost of the source node and/or the optimum window size may not be computed each time the method is iterated (e.g. as indicated by the dotted arrows in FIG. 4). For example, the cost of the source node may be calculated (in block 401) on every packet transmissions/reception, whilst the optimum window size may be calculated (in block 402) only when the actual window size exceeds the last calculated optimum window size by a threshold amount.

Although FIG. 4 shows congestion being signaled each time the actual window size exceeds the optimum window size ('Yes' in block 403), in other examples, congestion may be signaled only a subset of the times that this occurs, e.g. after n consecutive comparisons in block 403 which give the result 'Yes'. In an example, the method of FIG. 4 may be added onto the bottom of the method shown in FIG. 2.

The optimum window size $B_f^*$ satisfies:

$$U'(y_f) = C_{s(f)}^f \quad (9)$$

where s(f) is the source node of flow f and $U'(y_f)$ is the utility function. It has been shown that TCP performs an approximate utility maximization for a utility function satisfying:

$$U'(y_f) = \frac{1}{B_f^2} \quad (10)$$

where: $B_f = y_f RTT_f$ (11)

$B_f$ is the window size
$RTT_F$ is the round-trip time of flow f
It can therefore be derived that:

$$B_f^* = K\sqrt{C_{s(f)}^f} \quad (12)$$

where K is an arbitrary constant. The optimum window size may be computed (in block 402) using equation (12).

The value of K may be set as a system parameter. A large value of K results in small source node costs $C_{s(f)}^f$ which in turn implies smaller queues. However, if there are very few packets in the queues, this may affect the accuracy of the path estimates (and therefore also impact the performance). In an example implementation, a value of K=90 may be used, such that $C_{s(f)}^f \approx 5$ for window size $B_f$=40 packets ($\approx$64 kB). There may also be limits set on when congestion should not be signaled (e.g. in the form of a minimum optimum window size $B_f^*$). In an example, congestion may not be signaled if the window is smaller than 5 packets to avoid clogging a fast flow. Additionally, there may be a limit on the value of the source node cost $C_{s(f)}^f$ (e.g. $C_{s(f)}^f \leq 100$, which corresponds to $B_f$=9) regardless of the window size, to avoid excessive delays. The optimal choice of K may be prone to a potential scaling issue and therefore in some implementations, the value of K may be dynamically adapted as a function of path length.

In order to perform a comparison (in block 403), the actual window size is required. In some examples, the window size may be obtained by querying the operating system. In other examples, it may be estimated by inspecting TCP sequence numbers in packets being received and sent for the flow or by estimating $y_f$ and $RTT_f$ and then using equation (11). Methods of estimating $RTT_f$ are described below. The value of $y_f$ may be estimated by counting packets in a given time interval.

Congestion may be signaled (in block 404) using a number of different methods. One example is to drop excessive packets and in addition to working for TCP, this works well with other transport protocols, such as UDP. However, it may cause unnecessary packet losses. Another example is to use an explicit congestion notification (ECN) for TCP, although this may not be supported by the TCP stacks in all operating systems. In another example, operating system (OS) support may be used to signal congestion, e.g. using another API provided by the OS for signaling congestion on a connection (e.g. a congestion control module) or by asking the OS to halve the window itself. A further example is to send a congestion indicator by sending a fake triple duplicate ACK. This may be achieved by keeping a record of the last packet delivered to the IP layer at the source of flow f (a packet that carried an ACK for flow f). Once congestion is detected (e.g. in block 403), the same packet may be re-delivered to the IP layer three (or more) times (in block 404). TCP will treat this as a triple duplicate ACK and as a result will halve the congestion window.

Use of the method of FIG. 4 can avoid transmitting packets through the network and wasting the wireless resources only for the packets to be dropped at congested queues further through the network. Congestion is signaled not as a function of queue size but instead as a function of node cost (as shown in equation (12)).

Figure 5:
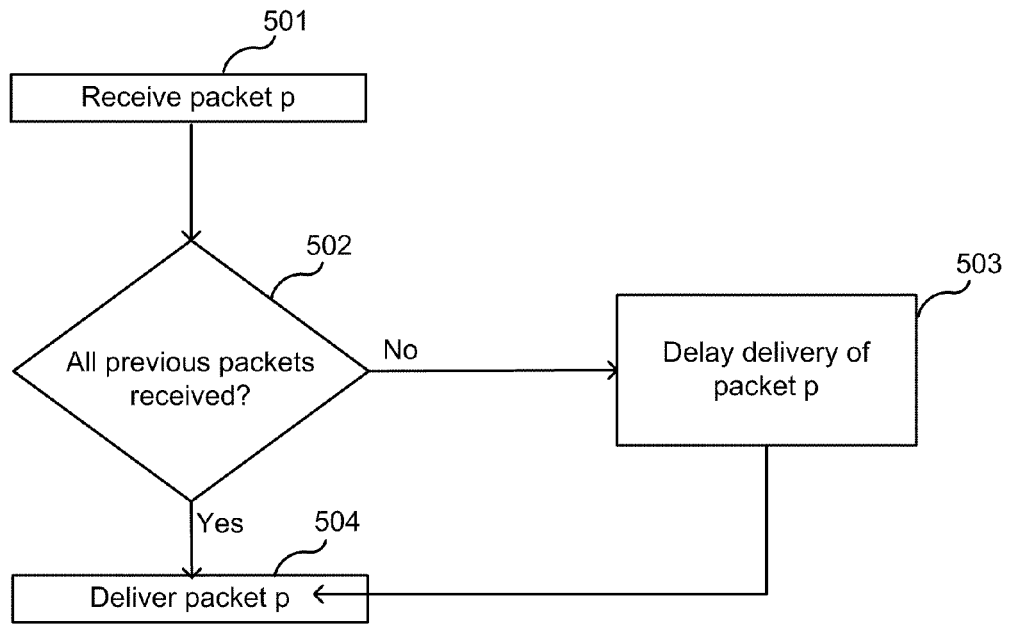
FIG. 5 is a flow diagram of an example method of packet reordering.

FIG. 5 is a flow diagram of an example method of packet reordering which may be implemented in combination with, or independently of, any of the other methods described herein. This method re-orders delayed packets received via multiple paths, where defined criteria are met, in order to deliver (where possible) an ordered sequence of packets to TCP. This improves the performance of TCP in a multipath routing environment, because TCP expects to receive packets in order and where a packet is received out of order, it is assumed that previous packets which have not been received have been lost. Loss of packets results in a reduction in the TCP window size (as described above) and degrades the performance of the network. The method cannot, however, delay delivery of packets to TCP indefinitely, whilst waiting for a delayed packet, because otherwise TCP may timeout. As a result there may be situations where it is not possible to deliver a fully ordered sequence of packets to TCP without a packet missing.

TCP estimates a round-trip time (RTT) using an exponentially weighted moving average algorithm: Let A(p) be the estimated RTT at the reception of packet p and let D(p) be the variance. The estimations are updated according to the following rules:

$$A(p+1)=(1-\alpha)A(p)+\alpha RTT(p+1)$$

$$D(p+1)=(1-\beta)D(p)+\beta|A(p)-RTT(p+1)| \quad (13)$$

where RTT(p) is the round-trip time of packet p and α and β are defined in TCP (where standard values are α=0.125 and β=0.25, but the values may be different for different implementations). Timeout (or re-transmission timeout, RTO) is defined as:

$$RTO(p+7)=A(p)+4D(p) \quad (14)$$

and it means that TCP triggers timeout if the acknowledgement for packet p+1 does not arrive RTO(p+1) after it has been sent.

As shown in FIG. 5, when a packet p is received (block 501), if a previous packet in a sequence has not been received ('No' in block 502), instead of delivering the packet p (in block 504), the delivery is delayed (block 503). In order to determine the amount of time a packet should be delayed (in block 503) before being delivered (in block 504), an estimate of one-way delays is maintained. Let $t_s(p)$ be the transmission time of packet p from node s (the source node for the flow) according to the clock at S, and let $t_d(p)$ be the reception time of packet p at destination d according to the clock at d. The skewed one-way propagation time is:

$$t_d(p)-t_s(p)=T_{sd}(p)+\Delta \quad (15)$$

where $T_{sd}(p)$ is the actual one-way propagation and Δ is an unknown clock skew. The mean skewed one-way propagation delay $A_{sd}(p)$ and its variance $D_{sd}(p)$ may be estimated using the same algorithm as in equations (13) above, i.e.:

$$A_{sd}(p+1)=(1-\alpha)A_{sd}(p)+\alpha(t_d(p+1)-t_s(p+1))$$

$$D_{sd}(p+1)=(1-\beta)D_{sd}(p)+\beta|A_{sd}(p)-(t_d(p+1)-t_s(p+1))| \quad (16)$$

The length of time that delivery of a packet p is delayed (in block 503) is given by:

$$t_s(p)+A_{sd}(p)+4D_{sd}(p) \quad (17)$$

The delayed-packet reordering, as shown in FIG. 5, works as follows: Suppose packet $p_1$ is delayed and packets $p_2, p_3, \ldots$ have arrived. If packet $p_1$ arrives before:

$$t_s(p_2)+A_{sd}(p_2)+4D_{sd}(p_2)$$

then packets $p_2, p_3, \ldots$ are delivered (in block 504). If, however, packet $p_1$ does not arrive by:

$$t_s(p_2)+A_{sd}(p_2)+4D_{sd}(p_3)$$

then packet $p_2$ is delivered. This will cause a duplicate ACK, but it will not decrease the TCP window, and will give more time for the delayed packet to arrive. Next, if packet $p_1$ does not arrive by:

$$t_s(p_3)+A_{sd}(p_3)+4D_{sd}(p_3)$$

then packet $p_3$ is delivered. The procedure is repeated until packet $p_1$ arrives, or the buffer is depleted. After three packets ($p_2, p_3, p_4$) are delivered out of order triple duplicate ACKs will be sent, and TCP sender will retransmit $p_1$ and halve the congestion window. However, this effect has less performance implications than the timeout itself.

As demonstrated in the example, the method spaces out packet delivery when there is a missing packet so that there is additional time for the missing packet to arrive. In addition packets may be spaced for delivery, even when there is no missing packet (e.g. by introducing a small delay between blocks 502 and 504 in FIG. 5), which artificially increases TCP's RTT estimate and results in a smoother (and slower) increase in window size. This means that if a packet is delayed, there is more time to wait for it. This also enables the method to accommodate paths of different speeds, e.g. a fast path and a slower path, and smoothes out the variability in delays on different paths through the network.

Figure 6:
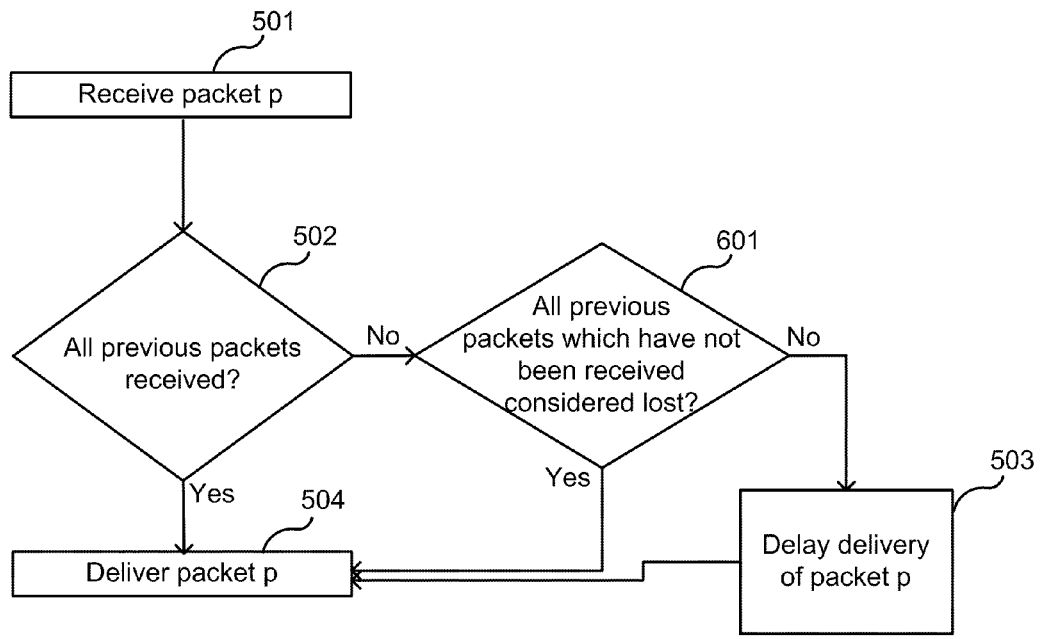
FIG. 6 is a flow diagram of another example method of packet reordering.

In some cases, the delayed packet may have been lost, e.g. due to a wireless error. In such a situation, if a packet is declared as lost ('Yes' in block 601), as shown in FIG. 6, the method continues as if the packet has been correctly delivered. In this example method, the subsequently received packet is only delivered without additional delay (i.e. avoiding block 503) if all of the earlier packets which have not been received are considered to be lost ('Yes' in block 601). Methods by which a packet can be determined as lost are described below. As described above, in order to space the delivery of packets there may be a small delay implemented before block 504 and therefore the delay introduced in block 503 may be considered to be an additional delay.

The methods described above and shown in FIGS. 5 and 6 may be applied to all packets or only to particular types of packets. In an example, if a packet is small (e.g. less than 60B) the packet may be delivered immediately (omitting block 503). Such small packets are likely to be TCP ACKs or TCP window probes and such packets will not generate any further ACKs and therefore will not result in triple duplicate ACK problems. This variation of the methods of FIGS. 5 and 6 may assist in further reducing the reordering delays.

Whilst the methods described above and shown in FIGS. 5 and 6 may not completely eliminated timeouts or triple duplicate ACKs when one path is significantly delayed or lossy, the rate of these events is significantly reduced and the performance of the network is increased.

Figure 7:
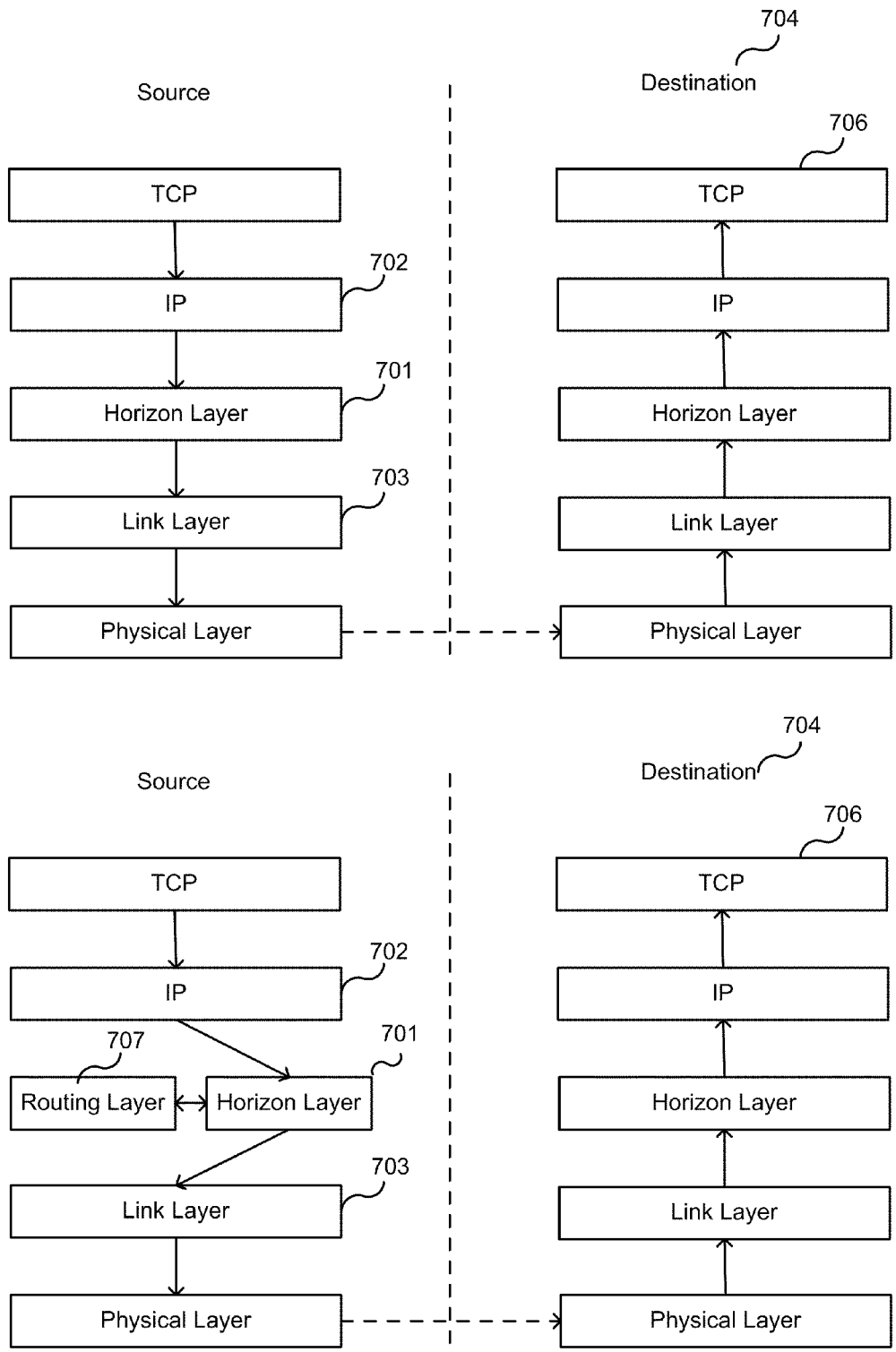
FIG. 7 shows two example architectures.

FIG. 7 shows two example architectures which includes a layer 701 (referred to as the 'Horizon layer') which may be used to implement some or all of the methods described above. Modifications are not required to the existing protocol stack. In the examples the Horizon layer 701 is implemented at layer 2.5 between the IP layer 702 and the link layer 703, which may be an Ethernet layer using MAC protocol (and referred as the Ethernet layer or MAC layer). In the first example, the Horizon layer 701 may obtain routing information through any routing API or daemon in the system. In the second example implementation, a routing layer 707 is used as a packet insert/extract point for the Horizon layer 701 and also provides routing information to the Horizon layer.

Although FIG. 7 shows two nodes—the source and the destination, in some examples there may be additional node between the source and the destination. The additional node, which may be referred to as a relay, only transfers the packet until the Horizon layer (i.e. the packet does not go any higher in the protocol stack than the Horizon layer 701).

In an example implementation, Horizon may be a user-space daemon within VRR routing protocol (as described in a paper by M. Caesar, M. Castro, E. B. Nightingale, G. O'Shea and A. Rowstron entitled 'Virtual ring routing: network routing inspired by DHTs' and presented in ACM SIGCOMM, 2006) on Microsoft® Windows XP (although the architecture is in no way tied to a particular operating system). VRR is an NDIS (Network Driver Interface Specification) driver installed between the L2 network drivers (e.g. MAC layer 703) and the IP layer 702 and redirects packets to and from the Horizon daemon via a packet chute (e.g. a short packet tunnel). Horizon may also periodically query VRR to obtain the routing tables. In another example, Horizon may be implemented in any kernel mode network driver that allows for insertion and extraction of packets in the receive/transmit data path of TCP. In an example, it could be implemented as an NDIS Intermediate Mode driver bound to the Ethernet driver.

When preparing a packet for transmission, Horizon picks the best route according to its own packet forwarding mechanism (as shown in FIG. 2 and described above) and prepares the packet with a destination's Ethernet MAC address. It then transmits the packet directly to wireless MAC. At a destination 704, packets may be delivered to the IP layer according to the delayed-reordering mechanism, as shown in FIGS. 5 and 6 and described above.

All state information in Horizon is soft, which enables it to react to topology and traffic changes. Horizon does not provide any guarantees on delivery; this is left to the upper or lower layers (e.g. TCP layer 706 or link layer 703). It also doesn't support packet fragmentation. As a common wisdom, RTS/CTS may be turned off for performance.

Whilst FIG. 7 shows a separate source and destination, it will be appreciated that a node may act as both a source and a destination and that packets may flow both up and down through a protocol stack.

Figure 8:
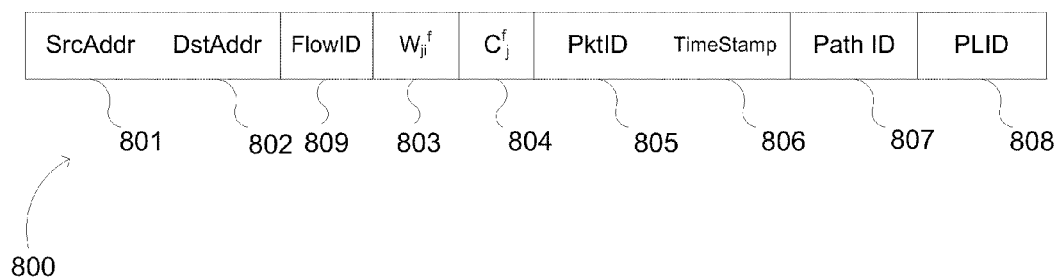
FIG. 8 shows an example of a header.

FIG. 8 shows an example of a header 800 which may be added to packets between the Ethernet and IP headers by the Horizon layer 701. Whilst FIG. 8 shows nine fields 801-809 within the header, a header may be used which contains only a subset of these fields (e.g. {801-804, 808}, {803, 804, 808, 809} or {801-803, 808}, with the node cost being transmitted by an alternative mechanism in the last of these three examples). The nine fields are:

SrcAddr 801: the packet's source address (e.g. 6 Bytes long)
DstAddr 802: the packet's destination address (e.g. 6 Bytes long)
FlowID 809: the identifier of the flow, which may potentially be used to distinguish between different TCP flows having the same source and destination (e.g. 1 Byte long)
$W_{ji}^{f}$ 803: the sequence number per link and per flow (PLID) of the last packet received by node j from node i from flow f (e.g. 1 Byte long)
$C_{j}^{f}$ 804: the cost of node j for flow f, as described above (e.g. 1 Byte long)
PktID 805: the sequential number of the packet in the flow (e.g. 1 Byte long)
TimeStamp 806: the transmission time of the packet, $t_s(p)$, as described above (e.g. 2 Bytes long)
PathID 807: an identifier for the path used by the packet (e.g. 1 Byte long)
PLID 808: the packet sequence number per link and per flow (e.g. 1 Byte long)

The uses for these fields and alternatives are described in more detail below. Dependent upon which of the methods described above are used, a different subset of fields may be used. In addition, some of the fields may be transmitted using an alternative mechanism (e.g. via a separate signaling channel).

The source and destination address fields 801, 802 are used to identify the flow. Deep packet inspection of the TCP header is not performed and instead if there are several TCP flows between the same source and destinations, they may be considered to be the same flow for the purposes of the methods described herein. Alternatively, the FlowID 809 may be used to distinguish between these TCP flows where the source and destination are the same. In such an example, the tuple of SrcAddr, DstAddr and FlowID may be used by subsequent nodes to identify a packet's flow. In some examples FlowID 809 may be used instead of one or both of the source and destination address fields 801, 802. The FlowID 809 may comprise a hash of the source and destination TCP ports.

Each packet in a flow is labeled sequentially with a PktID, field 805, and this field enables the re-ordering of packets before delivery to the IP layer, as described above with reference to FIGS. 5 and 6. The TimeStamp field 806 is also used in the re-ordering method (as described above) in order to estimate one way delays.

Each packet in a flow transmitted over a particular link may be labeled sequentially (PLID, field 808). This field may be used to detect packet loss because as all packets in the sequence traverse the same link and ordering on each path is guaranteed, if a PLID is missing, the packet is lost and not delayed. In addition, or instead, the PathID field 807 may be used to detect packet loss. Upon initialization, each node picks an 1-byte random ID and initially, the PathID of a packet is set to the random ID of the source node. Each node that forwards a packet XORs its random ID with the existing PathID value in the packet header and stores it back in PathID. It is then highly probable that the PathID of the packets traversing different paths will differ, whereas packet traversing the same path will always have the same PathID. The PathID field may be used to detect lost packets, because if a subsequent packet (i.e. a packet with a later PktID or PLID) is received at a node over each known path to that node, it is probable that an earlier and not received packet has been lost. In order to use the PathID in this manner, a node may maintain a list of PathIDs of known paths. This list may be updated periodically to remove PathIDs of obsolete paths (e.g. where the network changes, nodes disappear etc). The determination of when a path is obsolete may be performed using any suitable method such as: explicit notification of sets of current PathIDs or of obsolete PathIDs or a timeout mechanism, such that if a packet is not received with a particular PathID in a specified period of time, the PathID is removed from the set of current paths. It will be appreciated that the PathID may alternatively be generated using a different method and/or a different function instead of XOR.

In another example, packet loss may be detected at each hop and if it is determined by a node that a packet has been lost, a flag bit may be set in the header (not shown in FIG. 8). This flag bit may indicate that a packet with an earlier PktID has been lost. The flag bit may, in some examples, be an alternative to the use of a PLID (field 808). In an example of the use of such a flag bit, if a node detects that a single packet has not been received in sequence (using the PktID) and that the flag bit is set, the subsequent packet may be delivered to the IP layer without delay; however if a node detects that more than one packet has not been received in sequence and that the flag bit is set, the node may still use the delayed re-ordering mechanism as described above and shown in FIGS. 5 and 6. Although this method still results in the TCP window being halved, use of the flag bit results in the TCP window being halved and data being re-transmitted before timeout occurs, which reduces the overall delays in the system. In another example of the use of such a flag bit, no distinction is made on the basis of the number of missing packets. In such an example, if the flag bit is set, the packet which has been received is delivered to the IP layer without delay. Again, although this results in the TCP window being halved, it occurs more promptly than waiting for timeout. In some situations, the timeliness may be beneficial to the overall performance of the system.

The cost of a node $C_j^f$ (field 804) is used in path estimation and in determining a next node to transmit a packet to (as described above). Whilst in this example, the cost is shown as being included in a header of a packet being sent from a node (node j) to one of its upstream neighbors, in other examples the costs may be communicated using a different mechanism. The sequence number per link and per flow (PLID) of the last packet received by node j from node i from flow f ($W_{ji}^f$, field 803) may also be used in calculating costs and this is described in more detail below.

As described above, path qualities are estimated through queue sizes. The queue sizes used may be the per-flow queues at the Horizon layer or alternatively, the packets queued at the MAC level (i.e. at layer 703) may also be taken into consideration. However, it is difficult to track the number of packets in the MAC layer queue without exploring the underlying driver's architecture (e.g. the 802.11 driver's architecture) and thus being attached to a specific hardware. Also, the Horizon layer 701 may not be the only layer bound to the MAC layer, in which case it may not be possible to count the MAC egress packets in order to track the MAC layer queue. Furthermore, where the Horizon layer is implemented in the OS user space (as described above), frequently switching context to query a 802.11 driver's queue decreases performance.

If Horizon forwards all the packets immediately to the link layer, its queue will be empty and it will have no means to estimate path quality. Also, excessive packets will be dropped by the MAC, as may happen in the conventional network stack. The method therefore keeps packets in its own queue (i.e. in the Horizon layer) and occasionally forwards them to the MAC, whilst taking into consideration that having no packet in the MAC queue when the MAC is ready to transmit will reduce the link utilization.

In order to determine when Horizon should forward packets to the MAC, a concept of responsibility for packets may be introduced. A node is responsible for a packet until someone else takes over the responsibility or until the packet is dropped due to MAC loss. The total number of packets in the custody of a node i is divided into three groups: (I) the packets queued at Horizon at node i, (II) packets queued at MAC level of node i, and (III) packets already transmitted by node i but not acknowledged. Explicit acknowledgments at Horizon level to transfer responsibilities for packets may be used to control the number of packets in groups II and III, as described below.

Node i keeps track of $V_{ij}^f$, the PLID of the last packet of flow f sent from i to j. Node j acknowledges a successful reception of a packet to node i by sending $W_{ji}^f$, the PLID of the last packet of flow f received from i (at node j). The effect of this acknowledgement (which may be done using a field 803 in a packet header or by an alternative means) is that node j relieves node i of responsibility for all packets of flow f transmitted from i to j with a PLID lower or equal to $W_{ji}^f$.

The queue size of a node i, $P_i^f$, may be considered to be only those nodes actually queued at the Horizon layer (i.e. Group I) or may include packets where responsibility has not yet been transferred to another node (i.e. Groups II and III) e.g. using the mechanism described above. In an example, the value $P_i^f$ may be interpreted as the number of locally queued packets of flow f. Node i knows $V_{ij}^f$ and it also occasionally receives $W_{ji}^f$. The total number of packets in transition between Horizon layers 701 at nodes i and j (groups II and III) is:

$$V_{ij}^f - W_{ji}^f$$

These packets are still the responsibility of node i, and it counts them as not yet delivered.

If $Q_i^f$ is the total number of packets queued at node i at Horizon level for flow f (group I), then the total number of packets in the custody of node i for flow f is:

$$P_i^f = Q_i^f + \sum_{j \in D(f)} (V_{ij}^f - W_{ji}^f) \qquad (18)$$

This is the number of packets node i reports to its upstream nodes. By definition the queue at the destination node, d(f), of flow f may be set to zero (i.e. $P_{d(f)}^f = 0$).

In order to minimize the number of packets in group II and III but avoid starving the MAC layer, rules may be used which determine when node i is allowed to transmit a packet from flow f to node j. In an example, node i may be permitted to transmit a packet only if:

$$V_{ij}^f - W_{ji}^f < Z \qquad (19)$$

where Z is a back-pressure threshold (as described in more detail below), i.e. the combined size of groups II and III is limited by the back-pressure threshold parameter.

As described above, downstream nodes need to signal to their upstream peers their queue status for each flow. This may be done by either appending this information to a packet in the reverse direction (e.g. in field 804 of the header shown in FIG. 8) or by sending a dedicated 'refreshment' packet. A refreshment packet is a short packet that contains no payload but contains a header which includes $C_j^f$ and $W_{ji}^f$. Where a direct and a reverse flow's paths coincide, the status information (e.g. $C_j^f$ and $W_{ji}^f$) may be included in the header of a packet from the same flow traveling in the reverse direction (e.g. a TCP ACK packet) and this significantly reduces the signaling overhead compared to use of refreshment packets.

The values of $C_j^f$ and $W_{ji}^f$ are updated whenever a new packet is received; however, the value of $C_j^f$ changes more often—it also changes when node j receives new refreshments. Node j needs to signal updates to node i frequently enough to reflect these changes, but not so frequently that the updates create extra contention in the wireless medium.

The choice of refreshment frequency affects the choice of back-pressure threshold Z. As the refreshment frequency increases, a lower value of Z may be used (to the extreme where refreshments are sent after every event and Z could be as low as zero); however refreshments are not free because they use network resources. The optimal value of Z also depends on the MAC layer characteristics. If Z is too small, there is a risk of underutilizing the link by not supplying enough packets (as defined using equation (19)) and also the network will diverge from optimum performance because it is working based on 'old' cost and queue information. On the other hand, if Z is too large, load balancing may be disrupted by sending extra packets on low-quality routes. In an example implementation, node j sends refreshments about flow f to its upstream neighbors approximately after every 5 changes of $C_j^f$ and Z is in the range 10-15 packets.

The methods described above result in efficient use of the available resources and fairness amongst competing flows. The methods do not require any changes to 802.11 MAC and TCP/IP. Furthermore the methods require modest computational power and are suitable for implementation in practice (rather than purely theoretical study). Unlike known methods, the methods described above do not need to inject significant quantities of traffic into the network to provoke queues to start dropping packets. The methods described above detect congestion earlier which reduces packet loss, enables smaller congestion buffers and in effect reduces the packet delivery jitter (owing to the smaller number of buffered packets).

In the methods described above, end-to-end aspects may be taken into consideration by changing the utility function (e.g. by changing equation (9)). Changes to the utility function need not result in structural changes to any of the other algorithms described herein. End-to-end re-transmissions could be passed as a statistic in the control messages or the evolution of the TCP state machine may be observed (e.g. by tracking the sequence numbers to detect re-transmissions) or the RTP receiver reports may be examined in the case of certain UDP streaming (to detect loss/re-transmissions).

Figure 9:
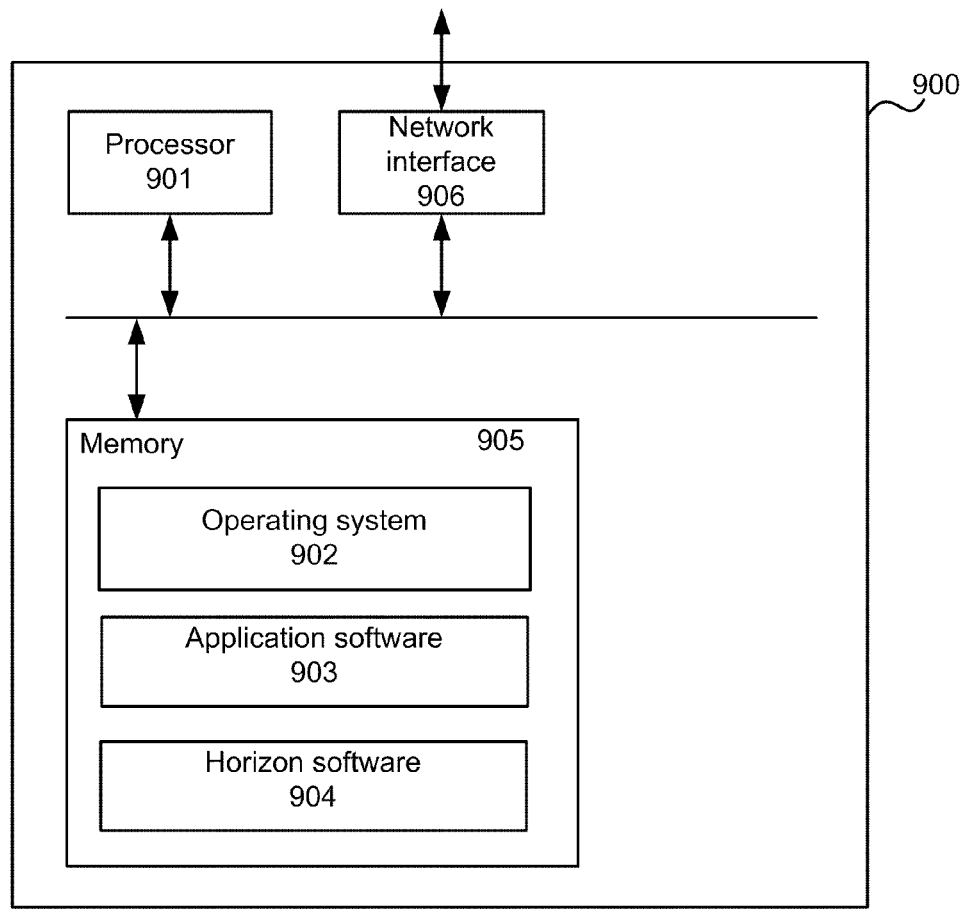
FIG. 9 illustrates an exemplary computing-based device in which embodiments of the methods described herein may be implemented.

FIG. 9 illustrates various components of an exemplary computing-based device 900 which may be implemented as any form of a computing and/or electronic device, and in which embodiments of the methods described above may be implemented. The computing-based device 900 may be a node in a wireless mesh network.

Computing-based device 900 comprises one or more processors 901 which may be microprocessors, controllers or any other suitable type of processors for processing computing executable instructions to control the operation of the device in order to implement any of the methods described above. Platform software comprising an operating system 902 or any other suitable platform software may be provided at the computing-based device to enable application software 903 and any Horizon software 904 to be executed on the device.

The computer executable instructions may be provided using any computer storage devices, such as memory 905. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

The computing-based device 900 comprises a network interface 906 for communication between the device and other such devices, e.g. in order to send and receive packets. Where the computing-based device 900 is a node in a wireless mesh network, the network interface 906 comprises a wireless network interface device.

The computing-based device 900 may also comprise one or more inputs and one or more outputs (not shown in FIG. 9), e.g. to enable user interface with the device, to provide an output to a display device etc.

Although the present examples are described and illustrated herein as being implemented in a wireless mesh network, the network described is provided as an example and not a limitation. As those skilled in the art will appreciate, the present examples are suitable for application in a variety of different types of wireless networks which use multipath routing and may involve multiple hops via intermediate nodes.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage device. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

APPENDIX

The utility maximization problem can be described as follows: Let N be the set of nodes and $F \subseteq N^2$ the set of flows in the network, defined as pairs of ingress and egress nodes. Let $x_{ij}^f$ be the packet rate from flow f on the wireless link from node i to j and let $y_f$ be the rate of fresh packets injected at the source node s(f) of flow f. The sets of upstream and downstream neighbors of node i for flow f are denoted $U_f(i)$, $D_f(i) \subseteq N$. These sets are predefined by an exogenous routing protocol.

Traffic at node i is stable if the total ingress traffic is smaller than the total egress traffic, which may be written as:

$$\sum_{j \in D_f(i)} x_{ij}^f - \sum_{j \in U_f(i)} x_{ji}^f - y_f 1_{\{s(f)=i\}} \geq 0 \quad (20)$$

where $1_{\{s(f)=i\}}=1$ if s(f)=i, or 0 otherwise. This equation (20) may be referred to as the flow conservation constraint. In addition:

$$x_{ij}^f \geq 0 \quad (21)$$

Let $R=\{(r_{ij})_{ij}\}$ be the set of feasible average rates on links (i,j) that can possibly be achieved by any MAC protocol. The rates R are determined by network topology, channel conditions, interference, etc. In this section it may be assumed that an ideal MAC is used that can achieve any rate from this set. Then the MAC layer (scheduling) constraints are:

$$\left(\sum_{f \in F} x_{ij}^f\right)_{ij} \in R \quad (22)$$

Equations (20)-(22) define the set of average flow rates a network can support: the set of flow rates $(y_f)_{f \in F}$ can be supported by the network (N,F) if there exist rates $(x_{ij}^f)_{i,j,f}$ that satisfy constraints (20)-(22).

Let $U_f(y_f)$ be a convex function of a flow's rate that defines the flow's utility. The total network utility is $\Sigma_f U_f(y_f)$. The goal of utility maximization approach is to find the flow rates $(y_f)_{f \in F}$ that solve:

$$\text{maximize } \Sigma_f U_f(y_f) \text{ subject to (20)-(22)} \quad (23)$$

The above optimization problem is convex, provided that set R is convex. The solution can be obtained via the dual formulation using a gradient descent algorithm. From there the optimal scheduling, routing and flow control algorithms can be derived.

Flow control: The optimal rate of flow f at time t, $y_f^*(t)$ is the solution of:

$$y_f^*(t) = \underset{y_f > 0}{\operatorname{argmax}} U_f(y_f) - y_f q_{s(f)}(t) \quad (24)$$

The source of flow f sets the rate of the flow $y_f$ as a function of number of packets in the queue $q_{s(f)}^f$ at the source of flow f, s(f).

Queue Evolution: The evolution of $q_i^f(t)$ is given by $$q_i^f = \left[q_i^f - \varepsilon\left(\sum_{j \in D_f(i)} x_{ji}^f - \sum_{j \in U_f(i)} x_{ji}^f - y_f 1_{\{s(f)=i\}}\right)\right]^+$$

where $[x]^+ = x$ if $x>0$, and otherwise 0. Variable $q_i^f$ is the Lagrangian corresponding to the constraint (20). This variable grows in proportion of the excess data arrived at node f that is not forwarded; it has the same evolution as the queue at node i for flow f.

Scheduling and Routing: The optimal routing and scheduling is defined by equation $$r^*(t) = \underset{r \in R}{\operatorname{argmax}} \sum_{i,j} r_{ij} \max_f (q_i^f(t) - q_j^f(t)) \quad (25)$$

For example, if $r_{ij}^*=0$ this represents a routing decision that no packet should be sent from i to j. The difference $q_i^f(t)-q_j^f(t)$ is called differential backlog. For every link (i,j) the flow with the maximum differential backlog is first selected and then the rate vector r*(t) is selected by maximizing equation (25), which defines which links should be active and with what rates. $x_{ij}^{f*}=r_{ij}$ and $x_{ij}^f=0$ otherwise.

The scheduling defined in (25) is called the back-pressure or max-weight scheduling, and it has been shown that in conjunction with (24) it also solves the network-wide optimization problem defined in (23).

Instead of considering the most general form of scheduling given by (28) it may be assumed that the underlying 802.11 MAC informs node i whenever it gets an opportunity to transmit (as in FIG. 2). The node should then decide what packet to transmit to which destination. For example, it can monitor the packet queue in the WiFi driver and, when the queue is empty, schedules the next packet. It may also be assumed that the node knows which transmission rate 802.11 MAC will use to transmit a packet to the selected destination (these rates are typically decided by MAC layer through some rate control protocol).

Based on these assumptions, the scheduling constrain (22) may be simplified in the following way. Suppose the total medium access time $T_i$ for node i, granted by 802.11 MAC, is given and constant. Node i has to decide what and where to transmit during that time. Let $R_{ij}$ be the transmission rate from i to j. Then the fraction of time node i transmits packets from flow f to node j is $x_{ij}^f/R_{ij}$ and there is the following constraint for all nodes i:

$$\sum_{f, j \in D_i(f)} \frac{x_{ij}^f}{R_{ij}} \leq T_i \quad (26)$$

Obviously, the assumption that $T_i$ is constant does not hold in reality and $T_i$ will depend on the load on i. For example, if node i has no traffic, then it will attempt no transmissions and $T_i=0$.

A simplified version of (23) may be generated by replacing constraint (22) with (26):

$$\text{maximize } \Sigma_f U_f(u_f) \text{ subject to (20), (21), (26)} \quad (27)$$

Let $\lambda_i^f$ be the Lagrangian multiplier associated with (23), $\delta_{ij}^f$ with (21) and $\mu_i$ with (26). From the KKT optimality conditions it can be derived that $x_{ij}^f > 0$ if and only if:

$$R_{ij}(\lambda_i^f - \lambda_j^f) = \mu_i \quad (28)$$

Equation (28) determines the pricing policy and the forwarding decisions as follows. Node i will schedule a packet from flow f and next-hop k that maximizes the following:

$$\max_{f \in F, k \in D_i(f)} R_{ik}(\lambda_i^f - \lambda_k^f)$$

The detailed algorithm (equations (1)-(5)) is described above.

The invention claimed is:

1. A method of operating a node in a wireless mesh network comprising:

receiving a node cost from each of a plurality of downstream neighbor nodes;

selecting a flow from a set of flows passing through the node, the selecting comprising selecting the flow having a queue of packets that will take a longest time to clear relative to other flows passing through the node;

selecting a destination node for a packet from said flow, the destination node being selected from a set of downstream neighbor nodes associated with said flow and being selected based at least on a node cost for said flow received from each of the set of downstream neighbor nodes; and forwarding the packet to the selected destination node.

2. A method according to claim 1, wherein selecting a flow from a set of flows passing through the node comprises:

selecting a flow from the set of flows based on the queue size for a flow at the node and a transmission rate from the node to a lowest cost downstream neighbor node for the flow.

3. A method according to claim 2, wherein the flow is selected using:

$$\operatorname*{argmax}_{g \in F, P_i^g > 0} \frac{P_i^g}{R_{ij(g)}}$$

where $P_i^g$ is the number of packets of flow g queued at the node i and $R_{ij(g)}$ is the transmission rate from the node to the lowest code downstream neighbor node j(g) for flow g.

4. A method according to claim 1, wherein selecting a destination node comprises:

selecting a destination node for a packet from said flow based on the node cost received from each of the set of downstream neighbor nodes for the selected flow and the transmission rate from the node to each of the set of downstream neighbor nodes.

5. A method according to claim 4, wherein the destination node is selected using:

$$\operatorname*{argmin}_{j \in D_g(i)} \left( \frac{P_i^g}{R_{ij}} + C_j^g \right)$$

where $P_i^g$ is the number of packets of the selected flow queued at the node, $R_{ij}$ is the transmission rate from the node to a downstream neighbor node j for the selected flow and $C_j^g$ node cost for a downstream neighbor node j for the selected flow.

6. A method according to claim 1, further comprising:
calculating a node cost for the node; and
communicating the node cost to each of a set of upstream neighbor nodes.

7. A method according to claim 6, wherein calculating a node cost for the node comprises:

calculating a node cost for the node and a flow, the node cost being based on a maximum time to clear a back-log of packets at the node for all flows and a node cost of a lowest cost downstream neighbor node for said flow.

8. A method according to claim 7, wherein each node cost is associated with a flow f and a node cost is calculated using:

$$\left( \max_{g \in F} \frac{P_i^g}{R_{i,j(g)}} \right) + C_{j(g)}^g$$

where $P_i^g$ is the number of packets of flow g queued at the node i, $R_{ij(g)}$ is the transmission rate from the node to the lowest code downstream neighbor node j(g) for flow g and $C_{j(g)}^g$ is a node cost of the lowest cost downstream neighbor node for said flow.

9. A method according to claim 6, wherein communicating the node cost to each of a set of upstream neighbor nodes comprises, for each upstream neighbor node:
inserting the node cost into a header of a packet; and
sending the packet to an upstream neighbor node.

10. A method according to claim 1, further comprising:
signaling congestion to a TCP layer in a protocol stack in the node if a TCP window size exceeds a computed optimum window size.

11. A method according to claim 10, wherein signaling congestion comprises generating a false triple duplicate acknowledgement if the TCP window size exceeds a computed optimum window size.

12. A method according to claim 1, further comprising:
receiving a packet from a second node, the packet being part of a sequence of packets;
determining if all packets before said packet in said sequence have been received; and
if a packet before said packet in said sequence has not been received, delaying delivery of said packet to a higher layer in a protocol stack in the node.

13. A method according to claim 12, further comprising:
determining if said packet that has not been received has been lost; and
if said packet that has not been received is determined as being lost, delivering said received packet to said higher layer in the protocol stack without delay.

14. A method according to claim 1, further comprising:
adding a header to a packet from the selected flow; and
forwarding said packet to the selected node.

15. A method of operating a node in a wireless mesh network comprising:
receiving, at an upstream node, cost data from a plurality of downstream nodes;
selecting said node to receive one or more packets based at least on the cost data received at the upstream node;
receiving, at said node, a first packet from a flow passing through the upstream node, the flow having a queue of packets taking a longest time to clear relative to other flows passing through the upstream node;
on receipt of the first packet from a sequence of packets, determining if all packets prior to said first packet in said sequence have been received; and
when a packet prior to said first packet in said sequence has not been received, delaying delivery of said first packet to a higher layer in a protocol stack at said node.

16. A method according to claim 15, wherein delaying delivery of said first packet comprises:
delaying delivery of said first packet for a period of time which does not exceed a maximum delay time, said maximum delay time being calculated based on a mean skewed one-way propagation delay and a delay variance.

17. A method according to claim 15, further comprising:
when said packet in said sequence that has not been received has been lost, delivering said first packet without delay.

18. One or more tangible storage devices with computer-executable instructions stored thereon for performing steps comprising:
   when an opportunity to transmit a packet occurs at a node in a wireless mesh network, selecting a flow from a set of packet flows through said node, the flow being selected based on at least a queue size at said node for each of the set of packet flows and on node costs received from a plurality of downstream neighbor nodes,
   wherein the selecting comprises selecting the flow having a queue of packets that will take a longest time to clear relative to other flows passing through said node;
   selecting a destination node for transmission of a packet, the destination node being selected from a set of downstream neighbor nodes for the selected flow and being selected based on at least a node cost of each of the set of downstream neighbor nodes for said flow and a transmission rate from said node to each of the set of downstream neighbor nodes; and
   forwarding the packet to the selected destination node.

19. One or more tangible storage devices according to claim 18, further comprising computer-executable instructions for performing steps comprising:
   calculating an optimum transmission window size for said flow based on a node cost for a source node for said flow; and
   signaling congestion to a higher layer in a protocol stack at said node if a transmission window size exceeds said optimum window size.

20. One or more tangible storage devices according to claim 18, further comprising computer-executable instructions for performing steps comprising:
   delaying delivery of a received packet to a higher layer in a protocol stack at said node if a packet with a lower packet identifier has not been received.

* * * * *